(12) United States Patent
Shevchenko et al.

(10) Patent No.: US 8,784,706 B2
(45) Date of Patent: Jul. 22, 2014

(54) SPHERICAL POWDER AND ITS PREPARATION

(75) Inventors: Ruslan Alekseevich Shevchenko, Moscow (RU); Andrey Pavlovich Chukanov, Moscow (RU); Boris Vladimirovich Safronov, Moscow (RU); Yuri Gennadievich Nadezhdin, Moscow (RU); Alexander Yurievich Vakhrushin, Moscow (RU)

(73) Assignee: MetaSphere Technology AB, Luleå (SE)

( * ) Notice: Subject to any disclaimer, the term of this patent is extended or adjusted under 35 U.S.C. 154(b) by 123 days.

(21) Appl. No.: 13/697,535

(22) PCT Filed: May 18, 2011

(86) PCT No.: PCT/EP2011/058073
§ 371 (c)(1),
(2), (4) Date: Jan. 16, 2013

(87) PCT Pub. No.: WO2011/144668
PCT Pub. Date: Nov. 24, 2011

(65) Prior Publication Data
US 2013/0134613 A1    May 30, 2013

(30) Foreign Application Priority Data

May 18, 2010 (RU) ................................ 2010119573
Jun. 10, 2010 (RU) ................................ 2010123471

(51) Int. Cl.
*B01J 2/04* (2006.01)
*C01B 31/34* (2006.01)
*B01J 2/18* (2006.01)
*C22C 29/08* (2006.01)

(52) U.S. Cl.
CPC . *C01B 31/34* (2013.01); *B01J 2/04* (2013.01); *C22C 29/08* (2013.01); *B01J 2/18* (2013.01)
USPC ...................................... 264/8; 425/8; 264/9

(58) Field of Classification Search
None
See application file for complete search history.

(56) References Cited

U.S. PATENT DOCUMENTS

| 5,089,182 A | 2/1992 | Findeisen et al. |
| 2006/0110659 A1 | 5/2006 | Matsuno et al. |

FOREIGN PATENT DOCUMENTS

| EP | 0 687 650 A1 | 12/1995 |
| EP | 1 857 204 A1 | 11/2007 |

(Continued)

OTHER PUBLICATIONS

International Search Report for corresponding International Application No. PCT/EP2011/058073 mailed Aug. 1, 2011.

(Continued)

*Primary Examiner* — Mary F Theisen
(74) *Attorney, Agent, or Firm* — Renner, Otto, Boisselle & Sklar, LLP

(57) ABSTRACT

A spherical tungsten carbide powder is characterized by that the material has a microhardness higher than 3600 kgf/mm$^2$, and that the powder has an apparent density from 9.80 to 11.56 g/cm$^3$. A method for the manufacture of a powder comprises the steps: a) providing a chamber comprising a rotatable crucible, b) adding material into said rotatable crucible, c) melting the material using a plasma arc discharge, d) rotating the crucible to atomize the molten material to form liquid droplets, with subsequent cooling of the droplets to obtain a powder, wherein the material added into said rotatable crucible is heated to a temperature above 40% of the melting temperature of the material before it enters the crucible. It is possible to reduce the current required for melting the stock. Heat losses are decreased, and the spherical powder obtained during atomization becomes more homogeneous in its composition and structure. The cost is reduced.

21 Claims, 2 Drawing Sheets

(56) References Cited

FOREIGN PATENT DOCUMENTS

| | | |
|---|---|---|
| RU | 2 301 133 C1 | 6/2007 |
| SU | 503688 A1 | 2/1976 |
| SU | 1802466 A1 | 3/1993 |
| WO | 2009/155666 | 12/2009 |

OTHER PUBLICATIONS

International Preliminary Report on Patentability for corresponding International Application No. PCT/EP2011/058073 mailed Aug. 13, 2012.

SPHERICAL POWDER AND ITS PREPARATION

This application is a national phase of International Application No. PCT/EP2011/058073 filed May. 18, 2011 and published in the English language, which claims priority to Application No. RU 2010119573 filed May. 18, 2010 and Application No. RU 2010123471 filed Jun. 10, 2010.

TECHNICAL FIELD

The present invention relates generally to preparation of a powder, by thermo-centrifugal atomization. The invention also relates to spherical tungsten carbide powder. The invention further relates to a device for implementing the method.

BACKGROUND

Wear resistance of composite materials depends for instance on factors including concentration and sizes of reinforcing particles and on matrix properties. Under equal conditions additional increase of wear resistance is achieved through improvement of the properties of particles in the composite. Preparation of particles through ingot crushing leads to flaws, reed marks and other defects in particles that act as seats of destruction under the influence of loads. Thus in the prior art there is a need for an improvement of the microstructure of particles and consequently their mechanical properties.

SU 1802466 discloses a method of preparation of powder of refractory material which includes processing of bars with bar supply to the melting zone with a pusher mechanism, melting of bars with plasma, teeming of a liquid-alloy with plasma stream of a second plasmatron, to pan nodulizer and centrifugal atomization.

Disadvantages include that the technology requires greater current intensity of the plasma discharge and that the use of two plasmatrons makes the process of powder preparation much more expensive.

SU 503688 discloses an installation for preparation of spherical materials comprising a vacuum vessel with a rotary graphite crucible inside, with an inbuilt movable unmeltable tube wire which delivers powder.

SU 503688 shows a method of preparation of spherical materials which includes an electrical discharge between a rotary graphite crucible being an anode and a tungsten unmeltable sleeve cathode which delivers the original substance to the crucible heated under the action of electric arc. In the crucible there appears a liquid alloy which rises under the influence of centrifugal force, and is pushed out of the crucible, where after it flies and solidifies to drops and crystallizes in flight. The process is to be carried out in an inert-gas medium—argon.

Disadvantages include that the unmeltable electrode in the device doesn't make it possible to get optimal parameters of electric discharge, the current increases, on the edge of the crucible a hardened liquid-alloy mass is formed (so called "beard") which leads to abnormality in the stability of the atomization process and frequent replacement of a crucible and, consequently, decrease of installation productivity and quality of the powder produced.

In the Journal of the Ukrainian SSR academy of sciences, No 72 (836), 1973 there is disclosed a method of producing a tungsten carbide alloy, with high hardness, strength and ductility.

RU 2301133 discloses a method and a device for preparation of refractory material powder, in particular cast tungsten carbide. The device comprises a rotatable crucible in a chamber in which the material is melted. Nitrogen is used as inert gas. Droplets are formed when the crucible rotates. Heating is provided by plasma arc discharge. The formation of a "beard" is avoided by moving the plasma stream. The heat output distribution from plasma can be varied from the edge of the crucible to the internal surface of the crucible in order to avoid the formation of beard.

In the prior art there is still a need to reduce the current of the plasma discharge required for melting the stock. There is also a need for an improved method to securely keep the liquid-alloy temperature higher than its melting point. There is also a need to reduce heat-losses, improve the homogeneity of the liquid-alloy and the homogeneity of the obtained powder.

Tungsten carbide alloy manufactured using conventional technology i.e. melting with subsequent crushing, has insufficient strength, due to presence of micro cracks.

SUMMARY

It is an object of the present invention to obviate at least some of the disadvantages in the prior art and provide an improved method and device for the preparation of a powder as well as an improved powder.

In a first aspect there is provided a spherical tungsten carbide powder, wherein the material has a microhardness higher than 3600 kgf/mm$^2$, and that the powder has an apparent density from 9.80 to 11.56 g/cm$^3$.

In a second aspect there is provided a method for the manufacture of a powder, said method comprising the steps: a) providing a chamber comprising a rotatable crucible, b) adding material into said rotatable crucible, c) melting the material, wherein heating at least partially is conducted using a plasma arc discharge, d) rotating the crucible to atomize the molten material under centrifugal force to form liquid droplets, with subsequent cooling of the droplets to obtain a powder, wherein the material added into said rotatable crucible is heated to a temperature above 40% of the melting temperature of the material before it enters the crucible.

In a third aspect there is provided a device suitable for manufacturing a powder, comprising a chamber, a lid, a movable plasma torch, a cylindrical cooled crucible, a collecting device for the manufactured powder, wherein the device comprises a heating device for material to be added to the crucible.

Further aspects and embodiments are defined in the appended claims, which are specifically incorporated herein by reference.

Advantages of the invention include that it is possible to reduce the current of the plasma discharge required for melting the stock, but also to securely keep the liquid-alloy temperature higher than its melting point. As a result the heat losses are decreased, the liquid-alloy becomes a homogenous composition, and the spherical powder obtained during atomization becomes homogeneous in its composition and structure.

A further advantage is that the distribution of the particles size becomes narrower, so that the yield of a desired particle size increases.

Yet another advantage is that the energy cost is significantly reduced. In one embodiment the energy consumption is more than 3.8 times lower compared to manufacture of spherical powder with induction heating.

BRIEF DESCRIPTION OF THE DRAWINGS

The invention is now described, by way of example, with reference to the accompanying drawings, in which.

DETAILED DESCRIPTION

Figure 1:
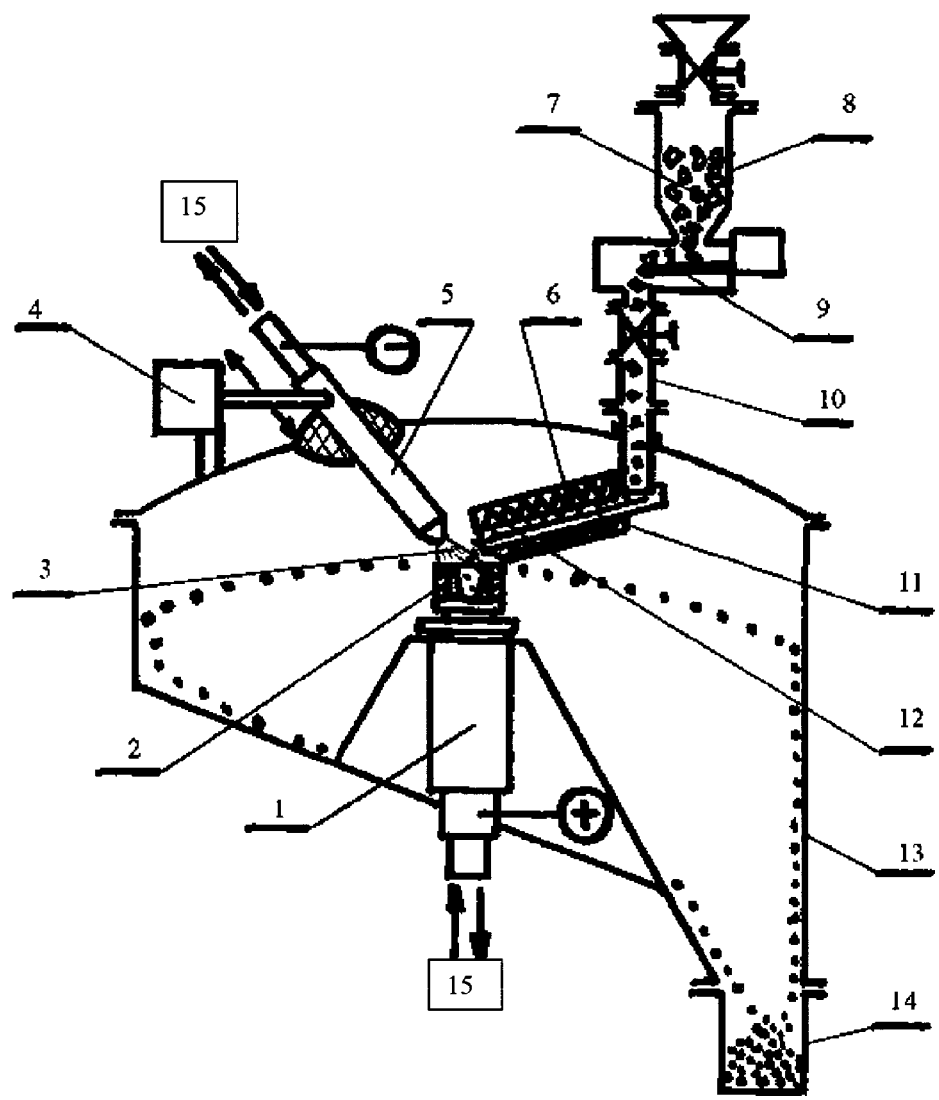
FIG. 1 presents an installation scheme for an embodiment of the preparation of refractory material powder. 15 denotes inlet and outlet of a cooling medium.

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

The term "about" as used in connection with a numerical value throughout the description and the claims denotes an interval of accuracy, familiar and acceptable to a person skilled in the art. Said interval is ±10%.

The term "apparent density" is used in throughout the description and the claims to denote the weight of a volume of the spherical powder. The apparent density is often measured in grams per cm$^3$.

The term "breaking load" is used in throughout the description and the claims denote the stress which, when steadily applied to an individual spherical powder particle is just sufficient to break or rupture it. The breaking load is measured by pressing a spherical powder particle between two flat surfaces with an increasing force until the spherical powder particle breaks or collapses.

The term "eutectic" is used in throughout the description and the claims to denote a mixture of compounds or elements that has a single that solidifies at a lower temperature than any other composition.

The term "microhardness" is used in throughout the description and the claims to denote the hardness testing of materials with low applied loads. Another term is "microindentation hardness testing." In microindentation hardness testing, a diamond indenter of specific geometry is impressed into the surface of the test specimen using a known applied force commonly called a test load. The microhardness is always measured using the Vickers hardness test HV 0.1 according to EN-ISO-6507 (ISO 6507-1:2005).

The term "spherical" is used in throughout the description and the claims in connection with powder particles to denote that the individual particles are essentially spherical. The term spherical in connection with a powder does not mean that all powder particles are perfect spheres, it means that most particles, such as more than 90%, preferably 95%, most preferably 99% of the powder particles are essentially spherical. Spherical particles can deviate from a perfect geometric sphere but as long as they are essentially spherical they are denoted spheres.

The ability to change the composition of the gas atmosphere, the flow of the cooling gas together with the ability to change the gas-dynamic and geometric parameters of the gas flow, temperature, the plasma discharge current intensity, composition and feed rate of plasma gas, the speed of rotation of the crucible can get a broad powder size range from a variety of refractory materials. Examples of refractory materials which can be utilized include but are not limited to tungsten and molybdenum, carbides of refractory metals, mixtures of carbides of refractory metals, for example, an eutectic mixture of tungsten carbide (WC-W$_2$C); borides, nitrides, and carbonitrides.

An eutectic mixture of tungsten carbides (WC and W$_2$C) with a content of carbon (C) of 3.8-4.2 wt % has high resistance against abrasive and chock wear. It is a part of compositions, used for manufacturing tools and abrasive resistant coatings within for instance building engineering, mining equipment, and chemical equipment, working in contact with hard materials.

In a first aspect there is provided a spherical tungsten carbide powder, wherein the material has a microhardness higher than 3600 kgf/mm$^2$, and wherein the powder has an apparent density from 9.80 to 11.56 g/cm$^3$.

In one embodiment the material has a microhardness from 3600 to 4200 kgf/mm$^2$. In an alternative embodiment the material has a microhardness from 3600 to 4800 kgf/mm$^2$.

In one embodiment the powder comprises form 3.8 to 4.2 wt % of carbon (C).

In one embodiment the powder contains less than 0.1 wt % iron (Fe).

In one embodiment the tungsten carbide is an eutectic mixture of W$_2$C and WC.

In one embodiment the diameter of the spheres is from 20 to 1800 μm.

In a second aspect there is provided a method for the manufacture of a powder, said method comprising the steps: a) providing a chamber comprising a rotatable crucible, b) adding material into said rotatable crucible, c) melting the material, wherein heating at least partially is conducted using a plasma arc discharge, d) rotating the crucible to atomize the molten material under centrifugal force to form liquid droplets, with subsequent cooling of the droplets to obtain a powder, wherein the material added into said rotatable crucible is heated to a temperature above 40% of the melting temperature of the material before it enters the crucible.

In one embodiment the material added into said rotatable crucible is heated to a temperature from 40% to 80% of the melting temperature of the material before it enters the crucible.

In one embodiment the above described tungsten carbide powder is manufactured by the method.

In one embodiment the material added to the crucible comprises carbon (C) and tungsten (W). In one embodiment the material added to the crucible comprises 3.7-3.9 wt % carbon (C).

In one embodiment a gas comprising at least one gas selected from the group consisting of argon, helium, and nitrogen is used in said chamber. In one embodiment nitrogen is used in said chamber. In one embodiment the chamber is cleaned from detrimental oxygen by vacuum pumping the chamber and filling it with a gas. In one embodiment a gas mixture is used to fill the chamber, whereas another gas mixture is used as plasma generating gas. Both the gas in the chamber and the plasma generating gas are selected as described above.

In one embodiment the plasma arc first is directed towards the centre of the crucible and thereafter is directed towards the edge of the crucible. In one embodiment the plasma arc alternating is directed towards the centre of the crucible and towards the edge of the crucible.

In one embodiment the temperature of the molten material is kept above the melting temperature of the material. In one embodiment the temperature of the molten material is more than 20° C. above the melting temperature of the material. In one embodiment the temperature of the molten material is from 20 to 100° C. above the melting temperature of the material.

In one embodiment the crucible rotates at a rotational speed of from 500 to 20000 rpm.

In one embodiment said powder comprises tungsten carbide. In one embodiment said powder comprises an eutectic mixture of WC and $W_2C$ phases.

In one embodiment said crucible is water cooled.

In one embodiment the method of preparation of tungsten carbide powder includes delivery of material of the required composition to a rotary crucible located in the chamber, melting of the stock with plasma arc discharge between the crucible being an anode, through the material, and plasmatron cathode with the usage of nitrogen as a plasma-supporting gas, atomization of a liquid-alloy in gaseous atmosphere under the influence of centrifugal force forming liquid-alloy drops and drops crystallization at cooling. In one embodiment the anode and cathode are changed so that the crucible is the cathode and the plasmatron an anode.

Melting of material in the device is made at least partially with plasma directly in the crucible. Direct heating of a hard stock to the temperature exceeding smelting point requires considerable power which leads to an increase of costs for conduction of the process and reduces productivity.

Pre-heating of original stock in a heater above the temperature 0.4*Tmel before its delivery to the crucible makes it possible not only to reduce current intensity of plasma discharge required for melting the stock, but also to securely keep the liquid-alloy temperature higher than its melting point. As a result heat losses are decreased, the liquid-alloy becomes a homogenous composition, and the spherical powder obtained during atomization becomes homogeneous in its composition and structure. With the same current intensity of plasma discharge pre-heating of the stock provides increased productivity of the atomization process.

Argon, helium, nitrogen or their mixture are in one embodiment used as a gas. In one embodiment the stock contains at least one refractory material. The crucible is to be rotated at the speed necessary for formation of drops of spherical granules of required particle composition at crystallization. Rotary speed of the crucible is in one embodiment from 500 to 20000 rpm. As a result there is obtained a powder of at least one refractory metal or refractory metal alloys or at least one carbide, boride or carbonitrides and other compositions of refractory metal, in particular, powder of eutectic mixture of tungsten carbide $WC-W_2C$.

The heating device for delivery of original stock to the crucible is in one embodiment made as a tray with a tube heater around or made as a tube heater, for example from composite material carbon-carbon. Connection angle of the heated device for delivery of original stock to the crucible is more than the angle of natural slip of the stock. The crucible is in one embodiment made of copper, an insert located on the inside wall of the crucible is made, for instance, of composite material carbon-carbon.

In one embodiment the material is added to said crucible by a vibrating feeder. In one embodiment the material is added to said crucible by a rotating feeder. Combinations of a vibrating feeder and a rotating feeder are encompassed.

In one embodiment the crucible vibrates. In such an embodiment a combination of vibrating frequency, diameter of the crucible, and rotational speed of the crucible should be selected to minimize the formation of beard.

In a third aspect there is provided device suitable for manufacturing a powder, comprising a chamber, a lid, a movable plasma torch, a cylindrical cooled crucible, a collecting device for the manufactured powder, wherein the device comprises a heating device for material to be added to the crucible.

In one embodiment said heating device is a tray comprising a heater. In one embodiment said heating device is a tubular heater. In one embodiment said heating device is made of a carbon material.

In one embodiment the device further comprises a feeding mechanism adapted to feed the material to said crucible by vibrations. In one embodiment the device further comprises a feeding mechanism adapted to feed the material to said crucible by rotation. Combinations of vibrations and rotation are also encompassed.

In one embodiment the crucible is adapted to vibrate.

In one embodiment the device for preparation of tungsten carbide powder contains cylindrical chamber with a cover where along the chamber axis a feed mechanism for delivery of original stock is located, with a bottom door having a device for powder unload, atomization device, located in line with the feed mechanism inside the chamber and made as cooled rotary current-conducting crucible, arc plasmatron fixed at an angle to the crucible's rotation axis with the possibility for its alternation.

One embodiment of the device depicted in FIG. 1 comprises a cylindrical chamber (13) with a sloped bottom and a cover. Plasmatron (5) and feed mechanism (10) are mounted into the cover in different directions of the axis. The plasmatron (5) is connected to the mover (4). The feed mechanism is connected to the storage hopper (8) with original stock (7) outside the chamber having a dosing mechanism (9). In the chamber in line with it a spaying crucible (2) fixed on a rotary mechanism (1) is located. Heated device for delivery of original stock (12) to the crucible (2) located in the chamber (13) is connected to the feed mechanism (10). Heating device may comprise a tray with tube heater (6) around.

The tube heater (6) is in one embodiment made of a composite material carbon-carbon, and serves in one embodiment as a heating device for delivery of powder in case of absence of a tray (11). In the lower part of the sloped bottom of the chamber(13) there is located a hopper (14) connected to it for collecting powder.

Figure 2:
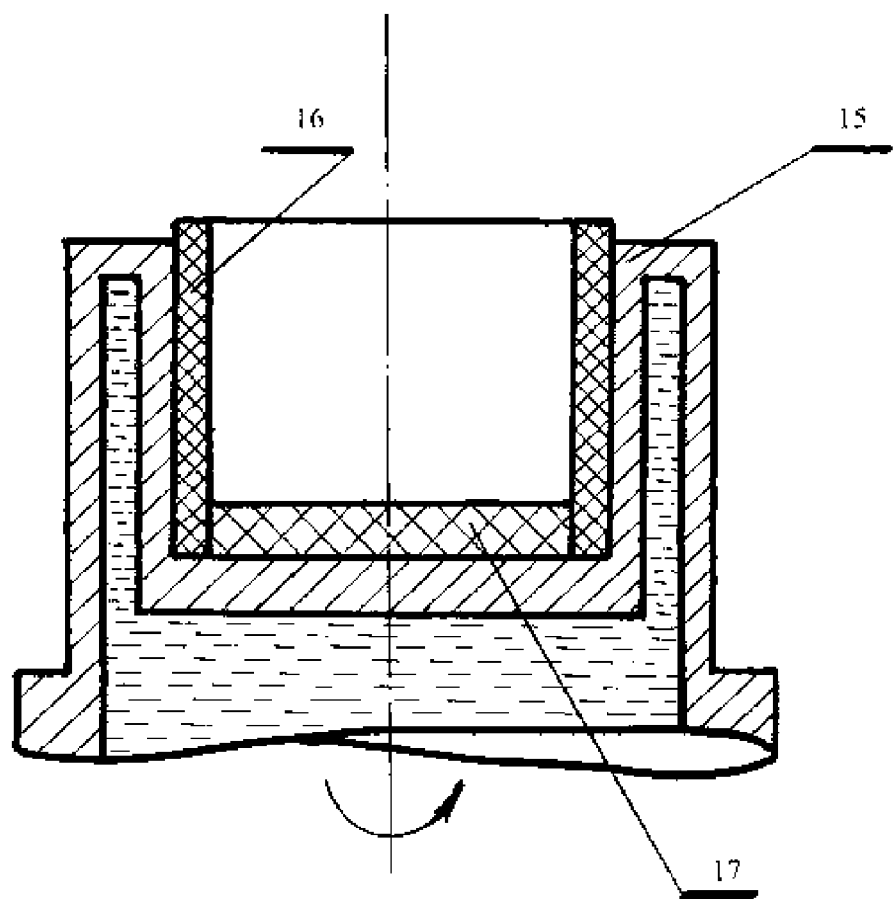
FIG. 2 presents the scheme of an embodiment of the crucible of the installation for preparation of refractory material powder.

The water-cooled atomization crucible (2) presented in FIG. 2 comprises a cylindrical framework (15) made of conductive material, an insertion (16) located on the inner wall of the framework made of a material inactive to melting and an insertion (17) located at the bottom of the framework made of conductive material.

In one embodiment of the method the device is operated according to the following. Original stock (7) in the form of grit from the storage (8) is loaded to the dosing mechanism (9). The installation is pressurized, vacuumed and filled with the required gas to the atmospheric pressure or the pressure necessary for preparation of powder of required refractory material. With the help of rotary mechanism (1) the required speed of crucible (2) rotation is set. Between the crucible being an anode and plasmatron cathode (5) the plasma arc is started. Anode spot of the arc is concentrated on the bottom of the crucible (2). The delivery of the powder is turned on. The grit from the dosing mechanism (9) through feed mechanism (10) goes to the tray (11) heated with the help of tube heater (6) made of, for instance, carbon-carbon material, up to 3000° C. Passing the tray particles of grit are heated above 0.4*Tmel and poured to the rotating crucible (2) where they melt under the influence of plasma arc. Tmel denotes the melting temperature. The liquid-alloy under the influence of centrifugal force is forced to the side face of the crucible (2) covered with heat-insulating insertion (16). As new portions of grit are being delivered the amount of liquid-alloy increases and it rises along the side face. Anode spot of plasma arc is risen after the liquid-alloy with plasmatron mover (4) and concentrated on the edge of the crucible (2). On reaching the edge of the crucible (2) the liquid-alloy is drawn out over the edge of the crucible by the centrifugal force and falls through the gas of the chamber where is solidifies during the fall and falls down from on the bottom of the chamber in the form of small spheres. Prepared powder is poured to the storage hopper (14) located in the lower part of the chamber.

The placement of a conductive material at the bottom of the crucible protects the crucible from burn-through. Placement of heat-insulating insertions of material inactive to melting on face sides of the crucible not only considerably reduces electro thermal loads on the crucible, but also considerably reduces total heat losses of material melting process. As a result, operational life of the crucible is prolonged and energy costs of the process are reduced.

Placement of the plasmatron and storage hopper with dosing mechanism at different directions of the cylindrical chamber axis makes it possible to promptly and accurately move the anode spot along the side face of the crucible after the rising liquid-alloy and to eliminate formation of hardened liquid-alloy on the edge (beard) of the crucible which leads to stabilization and homogenization of liquid-alloy and improvement of properties of the powder prepared.

The possibility of alternation of gaseous atmosphere composition, preliminary heating device temperature, current intensity of plasma discharge, the crucible rotation speed makes it possible to prepare powder of a wide dimensional range out of various refractory materials: refractory metals, such as tungsten and molybdenum; carbides of refractory metals; mixture of carbides of refractory metals, for instance, cast tungsten carbides (WC-$W_2C$); borides, nitrides and carbonitrides, carbonitroborides and other refractory metals compounds.

In one embodiment the breaking load of a spherical tungsten carbide alloy particle according to the invention is larger than 20 kgf. In one embodiment the breaking load of a spherical tungsten carbide alloy particle according to the invention of from about 20 to about 27 kgf. In an alternative embodiment the breaking load of a spherical tungsten carbide alloy particle according to the invention of from 20.8 to 27.2 kgf. The measurements of the breaking load is repeated 20-30 times and an average value is calculated.

The hardness of spherical tungsten carbide alloy is the highest of all achieved for carbides of metals and concedes only to hardness of a diamond and the boron carbide.

Comparative characteristic of some hard materials

| Material | Microhardness, kgf/mm$^2$ |
|---|---|
| Tungsten carbide | 1780-2000 |
| Titanium carbide | 2800-3000 |
| Crushed tungsten carbide alloy | 1800-2200 |
| Spherical tungsten carbide alloy, present product | 3600-4800 |

Other features and uses of the invention and their associated advantages will be evident to a person skilled in the art upon reading the description and the examples.

It is to be understood that this invention is not limited to the particular embodiments shown here. The following examples are provided for illustrative purposes and are not intended to limit the scope of the invention since the scope of the present invention is limited only by the appended claims and equivalents thereof.

EXAMPLES

Example 1

Atomization of tungsten with melting point 3380° C. was carried out on an installation for centrifugal atomization equipped with the mechanisms of suggested invention and without them. Atomization was carried out in a pure nitrogen atmosphere. The crucible was used with the insertions suggested in the invention and without them. Diameter of an open edge of the crucible was 60 mm. The crucible rotary sped was 5000 rpm. The current of the plasma arc was alternated within the limits from 800 to 1500 A, voltage on the arc was 70-85V. Preliminary heating of grit was carried out by means of contact of moving original grit with the trough surface of tungsten with a tube neater around. The heater is made of composite material carbon-carbon and it was heated up to 2500° C. with passing current from an autonomic electrical power source. Outlet temperature of the grit from the heater was 1850-1950° C. The results of atomization are given in Table 1. Atomization of tungsten with the suggested method on the suggested device provides increase of process productivity, stabilization of properties of spherical powder obtained and considerable reduction of current and thermal loads on the crucible which prolongs its operation life.

TABLE 1

| Characteristics | Dimensions | According to the invention | | | Known method | | |
|---|---|---|---|---|---|---|---|
| Plasma arc current | A | 800 | 1100 | 1500 | 800 | 1100 | 1500 |
| Productivity | kg/hour | 20 | 24 | 28 | 5 | 8 | 16 |
| Average diameter of powder particles | mm | | 200 | | | 260 | 200 |
| Powder characteristics | | Almost completely spherical particles. Homogenous particles no micro cracks | | | Presence of original grit particles and melted pieces of irregular shape | | Spheres |

Example 2

Cast tungsten carbides (eutectic mixture of tungsten carbides $WC-W_2C$) was atomized at centrifugal atomization installation at the crucible rotary speed 2850 rpm. For atomization a grit of crushed cast tungsten carbide with particles size less than 1 mm was used. Content of carbon in original grit was 4.0% of its mass, average microhardness of crushed cast tungsten carbide Hµ-1800 HV. The current of the plasma arc was alternated within the limits from 800 to 1500 A, the voltage on the arc was 70-85 V. Preliminary heating of cast tungsten carbide grit was carried out by means of contact of moving original grit with inner surface of tube heater. The heater is made of composite material carbon-carbon and it was heated up to 2200° C. with passing current from an autonomic electrical power source. Outlet temperature of the grit from the heater was 1850-1900° C. Atomization was carried out in pure nitrogen atmosphere with open edge diameter 62 mm. Also comparative atomization of cast tungsten carbide grit by the known method was carried out. Atomization results are given in Table 2.

TABLE 2

| Characteristics | Dimensions | Present invention | | | Known method | | |
|---|---|---|---|---|---|---|---|
| Current of plasma arc | A | 800 | 1100 | 1500 | 800 | 1100 | 1500 |
| Productivity | kg/hour | 22 | 27 | 32 | 7 | 12 | 18 |
| Average diameter of powder particles | µm | | 300 | | | 360 | 300 |
| Powder characteristics | | Almost completely spherical particles Homogenous particles no micro cracks | | | Presence of original grit particles and melted pieces of irregular shape | | Spheres |
| Micro-hardness | Kgf/mm² | | 3600-4200 | | | 3400-3550 | |

Atomization of cast tungsten carbide with the suggested method on the suggested device provides increase of process productivity, stabilization of properties of spherical powder obtained and considerable reduction of current and thermal loads on the crucible which prolongs its operation life. Microhardness of cast tungsten carbide powder prepared by the declared method is within the range 3600-4200 HV, which is 1.2-1.3 times as higher than microhardness values of cast tungsten carbide powder prepared by the known method.

Example 3 (Comparative)

The resulting powder had a particle size ranging from 50 microns to 800 microns. Micro-hardness of fused tungsten carbide powder produced by the method was in the range of 3400-3550 kgf/mm². That is 1.25-1.27 times the value of the micro-hardness of tungsten carbide powder produced in an argon atmosphere. Increase in micro-hardness significantly increases the material resistance to abrasion.

Apparent density of the obtained powder was in the range 8.5-10.0 g/cm³, which indirectly indicates its internal porosity and deviations from perfect spheres.

The use of electric currents of high intensity slightly increases the hardness and strength characteristics of the product. But the electrodes are easily damaged and require frequent replacement due to the impact of high current. In addition, when using high currents rapid wear of the edge of the crucible occurs. This leads to the destabilization of the atomization process, the formation of "beard" and requires frequent replacement of the crucible. Related downtime leads to poor performance of the production unit and costs increase.

Example 4

Powder with spherical shape was produced with centrifugal atomization in a helium atmosphere. As plasma gas mixture helium and nitrogen in a ratio of 1:1 was used. Input raw material had a carbon (C) content of 3.90-3.92 wt %. The raw material was heated to 1050-2000° C. before entered to the rotating crucible. Atomization was performed at the same rotational speed, as in Example 3. Atomization was performed at the maximum value of electric current plasma arc i.e. no more than 1200 A.

The resulting powder particles were spherical in shape with virtually no internal porosity. Anode arc spot was raised after the melt and focused on the inner edge of the crucible, which provided a complete absence of uncontrolled formation of solid carbide—"beard"—on the edge of the crucible. The apparent density of the powder was 9.80-11.5 g/cm³, which confirms the substantial decrease in the level of porosity and impurity content in the resulting material compared with material from example 3.

Micro hardness of the tungsten carbide powder produced by the claimed method in a helium atmosphere using plasma gas helium-nitrogen resulted in the range of 3600-4800 kgf/mm². That is 1.20-1.27 times the micro hardness of tungsten carbide powder produced in a nitrogen atmosphere. The increase of the micro hardness significantly increases the material resistance to abrasion and is a determining parameter in the choice of powder as a filler for wear-resistant coatings.

Reducing current plasma discharge has significantly simplified the design of current electrodes construction, significantly increase the life time of the electrodes and thus significantly reduces operating costs.

Example 5

Atomization was performed of crushed nibs (grains) of raw material containing 3.8-3.9 wt % fixed carbon, 0.09-0.10 wt % free carbon and 1.1-1.2 wt % of other impurities (chromium, vanadium, niobium, cobalt, etc.) and 0.5, 0.3; 0.15 and 0.1 wt % iron content and other impurities. Atomization regimes was maintained as in Example 4. The grit were preheated to 1050-2000° C. As a result of the process including atomization, overall levels of impurities in produced powder (including iron) decreased to 0.4-1.1 wt % (depending on the purity of the starting material) compared to the initial level of impurities in the crushed raw material. Reducing the iron content in the produced spherical powder compared with the contents of the previously atomized grit was 0.05-0.40 wt % (depending on the content of the raw material). In this case, free carbon content decreased to 0.05-0.08 wt %, and other impurities in the range of 0.2-0.7 wt %.

Under conditions where all other circumstances are equal the purity of the raw material (grit) define the properties of the manufactured powder and may give additionally increased microhardness to the material. Depending on the content of impurities the micro hardness of the produced spherical powder varied from 3600 kgf/mm², (for iron content less than 0.10 wt %, free carbon less than 0.05 wt %, other impurities not exceeding 1.0 wt %) up to 4800 kgf/mm² (for iron content less than 0.06 wt %, free carbon less than 0.02 wt %) and the content of other impurities less than 0.50 wt %. In this case, the apparent density ranged from 9.80 to 11.5 g/cm³. In one embodiment a critical value, which determines the characteristics of the material is that the iron content is less than 0.1 wt %. In this embodiment, the apparent density of the powder, with iron content over 0.1 wt %, is 0.3 to 0.1 units (g/cm$^3$) lower than the apparent density of powder with an content less than 0.1 wt %.

The claimed set of essential features provides fused tungsten carbide, a spherical particle with a high micro hardness, high resistance to crushing forces and high apparent density of the powder. The above properties of the powder produced contribute to high a resistance to abrasion and impact wear.

Example 6

Atomization using carboboride tungsten nibs (grain). This is a mixture of carbide and boride of tungsten. I.e. it comprises $W_2C$, WC, and $W_2B_5$. 50% of $W_2C$+WC, and 50% of $W_2B_5$. The rotational speed of the crucible was about 5000 rpm. The grit was pre-heated to 1800° C. The arc current was 1000 A. The atomization was performed on a device according to the description. Helium was used to fill the device, and a mixture of 50% argon+50% helium was used as plasma generating gas. The plasma was directed towards the inside of the crucible and towards the edge of the crucible in order to minimize the formation of beard.

When performing atomization with the standard technology, the formation of more than 30% of particles of irregular shape and the formation of "beard" on the edge of the crucible occurred. Implementation of the proposed method allowed us to obtain spherical carboboride tungsten with a yield of ~85% and 20-30% higher level of micro hardness of the spherical carboboride than that obtained by previous atomization technology.

A number of tests are summarized in the below table. The size of the particles are from 20-1200 μm.

The invention claimed is:

1. A method for the manufacture of a spherical powder comprising tungsten carbide, said method comprising the steps:
   a) providing a chamber comprising a rotatable crucible,
   b) adding material into said rotatable crucible,
   c) melting the material, wherein heating at least partially is conducted using a plasma arc discharge,
   d) rotating the crucible to form liquid droplets, with subsequent cooling of the droplets to obtain a powder,
   wherein the material added into said rotatable crucible is heated to a temperature from 40% to 80% of the melting temperature of the material before it enters the crucible, and that the material added to the crucible comprises carbon (C) and tungsten (W).

2. The method according to claim 1, wherein the material added to the crucible comprises 3.9-4.5 wt % carbon.

3. The method according to claim 1, wherein a gas comprising at least one gas selected from the group consisting of argon, helium, and nitrogen is used in said chamber.

4. The method according to claim 1, wherein nitrogen is used in said chamber.

5. The method according to claim 1, wherein the plasma arc first is directed towards the centre of the crucible and thereafter is directed towards the edge of the crucible.

6. The method according to claim 1, wherein the plasma arc alternating is directed towards the centre of the crucible and towards the edge of the crucible.

7. The method according to claim 1, wherein the temperature of the molten material is kept above the melting temperature of the material.

8. The method according to claim 1, wherein the temperature of the molten material is more than 20° C. above the melting temperature of the material.

| Rotation speed (rpm) | Current (A) | Microhardness (kgf/mm$^2$) Argon | Microhardness (kgf/mm$^2$) Nitrogen | Crushing force (Kgf) Argon | Crushing force (Kgf) Nitrogen | Remark |
|---|---|---|---|---|---|---|
| 400 | 700 | 2700 | 3400 | 14.0 | 19.2 | The particles were porous and up to 25% were not spherical |
| 500 | 700 | 2700 | 3400 | 14.1 | 19.4 | |
| 1000 | 700 | 2700 | 3450 | 14.1 | 20.2 | |
| 5000 | 700 | 2750 | 3500 | 14.2 | 21.6 | |
| 15000 | 700 | 2750 | 3500 | 14.2 | 21.0 | |
| 20000 | 700 | 2750 | 3550 | 14.3 | 21.4 | |
| 400 | 1200 | 2700 | 3400 | 14.6 | 20.3 | The particles were porous and up to 18% were not spherical |
| 500 | 1200 | 2700 | 3400 | 14.7 | 20.4 | |
| 1000 | 1200 | 2740 | 3450 | 14.7 | 20.7 | |
| 5000 | 1200 | 2750 | 3500 | 14.8 | 20.8 | |
| 15000 | 1200 | 2760 | 3500 | 14.8 | 21.0 | |
| 20000 | 1200 | 2770 | 3550 | 14.8 | 21.5 | |
| 400 | 2400 | 2730 | 3450 | 15.0 | 21.3 | The particles were porous and up to 15% were not spherical |
| 500 | 2400 | 2740 | 3470 | 15.1 | 21.4 | |
| 1000 | 2400 | 2750 | 3480 | 15.1 | 22.0 | |
| 5000 | 2400 | 2760 | 3530 | 15.2 | 22.8 | |
| 15000 | 2400 | 2770 | 3540 | 15.2 | 23.0 | |
| 20000 | 2400 | 2790 | 3550 | 15.3 | 23.5 | |

The porosity was determined by hydrostatic weighing.

9. The method according to claim 1, wherein the crucible rotates at a rotational speed of from 500 to 20000 rpm.

10. The method according to claim 1, wherein said powder comprises an eutectic mixture of WC and $W_2C$ phases.

11. The method according to claim 1, wherein said crucible is water cooled.

12. The method according to claim 1, wherein the material is added to said crucible by a vibrating feeder.

13. The method according to claim 1, wherein the material is added to said crucible by a rotating feeder.

14. The method according to claim 1, wherein the crucible vibrates.

15. A device suitable for manufacturing a powder, comprising a chamber, a lid, a movable plasma torch, a cylindrical cooled crucible, a collecting device for the manufactured powder, wherein the device comprises a heating device for the material to be added to the crucible and wherein the heating device is adapted to heat the material to a temperature from 40% to 80% of the melting temperature of the material before it enters the crucible.

16. The device according to claim 15, wherein said heating device is a tray comprising a heater.

17. The device according to claim 15, wherein said heating device is a tubular heater.

18. The device according to claim 15, wherein said heating device is made of a carbon material.

19. The device according to claim 15, wherein said device further comprises a feeding mechanism adapted to feed the material to said crucible by vibrations.

20. The device according to claim 15, wherein said device further comprises a feeding mechanism adapted to feed the material to said crucible by rotation.

21. The device according to claim 15, wherein said crucible is adapted to vibrate.

* * * * *